(12) United States Patent
Young (10) Patent No.: US 9,894,846 B1
(45) Date of Patent: Feb. 20, 2018

(54) DEVICE FOR STAKING A TREE (76) Inventor: Jeannette Kathleen Young, Richmond, TX (US)

( * ) Notice: Subject to any disclaimer, the term of this patent is extended or adjusted under 35 U.S.C. 154(b) by 0 days.

(21) Appl. No.: 13/105,477

(22) Filed: May 11, 2011

Related U.S. Application Data (63) Continuation-in-part of application No. 12/854,515, filed on Aug. 11, 2010, now abandoned.

(60) Provisional application No. 61/234,733, filed on Aug. 18, 2009.

(51) Int. Cl.
A01G 9/12 (2006.01)

(52) U.S. Cl.
CPC ............... *A01G 9/12* (2013.01); *A01G 9/122* (2013.01)

(58) Field of Classification Search
CPC .......... A01G 9/12; A01G 9/122; A01G 9/124; A01G 9/128; A01G 17/04; A01G 17/12
USPC .... 47/32.4, 32.5, 40.5, 41.11, 41.14, 42, 43, 47/44, 45, 46, 47
See application file for complete search history.

(56) References Cited

U.S. PATENT DOCUMENTS

| | | | |
|---|---|---|---|
| 1,515,551 A * | 11/1924 | Christo | 56/329 |
| 4,649,666 A * | 3/1987 | Ness et al. | 47/43 |
| 4,757,641 A * | 7/1988 | Penrod | 47/39 |
| 4,848,027 A | 7/1989 | Skierwiderski | |
| 4,870,781 A | 10/1989 | Jones | |
| 4,894,950 A * | 1/1990 | Yukio et al. | 47/42 |
| 5,129,179 A | 7/1992 | Kronmiller | |
| 5,199,214 A | 4/1993 | Caldwell | |
| 5,402,600 A * | 4/1995 | Tompkins | 47/42 |
| 5,568,700 A | 10/1996 | Veneziano et al. | |
| 5,819,468 A * | 10/1998 | Jollie | 47/32.4 |
| 6,032,408 A * | 3/2000 | Nielsen | 47/42 |
| 6,256,942 B1 * | 7/2001 | Schatz | 52/155 |
| 6,299,125 B1 * | 10/2001 | Zayeratabat | 248/530 |
| 6,363,655 B1 * | 4/2002 | Napolitano | 47/42 |
| 6,625,926 B1 * | 9/2003 | Mancini | 47/42 |
| 2002/0011023 A1 | 1/2002 | Ambrose | |
| 2003/0066233 A1 * | 4/2003 | Gunderman et al. | 47/45 |
| 2008/0092439 A1 | 4/2008 | Banks | |
| 2012/0073193 A1 * | 3/2012 | Duplantis | 47/45 |
| 2012/0097080 A1 * | 4/2012 | Agg et al. | 111/100 |

* cited by examiner

*Primary Examiner* — Lisa L Tsang
(74) *Attorney, Agent, or Firm* — Egbert Law Offices, PLLC (57) ABSTRACT A device for staking a tree into the earth has a ring suitable for extending around the trunk of the tree. A plurality of brackets are connected to the ring. The plurality of brackets have aperture formed therethrough suitable for receipt of stakes, which secure the ring to the earth. A support is connected to the ring and extends upwardly therefrom. A collar is connected to the support and positioned in spaced relation to the ring. The collar also has a diameter suitable for extending around the trunk of the tree.

9 Claims, 6 Drawing Sheets

DEVICE FOR STAKING A TREE

CROSS-REFERENCE TO RELATED APPLICATIONS

The present application is a continuation-in-part of U.S. patent application Ser. No. 12/854,515, filed on Aug. 11, 2010 and entitled "Device for Staking a Tree".

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to tree staking devices. More particularly, the present invention the relates to a framework that can be affixed into the earth adjacent to the root ball and trunk of a tree so as to extend upwardly in order to support the trunk of a tree in a desired orientation.

2. Description of Related Art Including Information Disclosed Under 37 CFR 1.97 and 37 CFR 1.98

The staking of a young tree most commonly involves strapping the tree to one or more stakes to keep the tree from swaying in the wind. The usual approach to staking a tree in the ground is to strap the tree's trunk to two stakes set well apart in the soil on opposite sides of the tree. For a very young tree in a planter box with limited space, a single stake is normally used. This is usually a smaller temporary stake strapped directly to the tree's trunk. The tree is kept in an upright position by staking until it is strong enough to support its own weight, and until it can withstand normal wind conditions without damage or breakage.

Such known staking methods have disadvantages which are detrimental to the tree's health and proper growth. First, it is known that sway caused by wind conditions stimulates growth, and promotes root development and the ability of the tree to strengthen itself. If staked in accordance with the aforementioned conventional methods, a young tree will not be permitted to sway below the points where the straps engage the tree. The development of the tree will thereby be inhibited, with the lower portion of the tree remaining relatively thin, a condition known as "reverse taper." A tree experiencing a reverse taper condition may lean or fall over if and when the supporting stakes become broken or are removed.

Another disadvantage to these known staking methods is that the straps used to tie the tree trunk to the stakes are often, due to in intention or lack of non-knowledge of the caregiver, too tight. A strap that is too tightly wound can girdle the trunk, thereby inhibiting the flow of nutrients through the trunk which may, in turn, inhibit proper growth. A conventionally staked tree should regularly be maintained to prevent the straps from becoming too tight as the tree grows.

The conventional staking techniques often include wires or cables that extend from the stake to the tree. In normal use, these wires are cables are often nearly invisible. It is known that bicycle riders, motorcycle riders, snowmobile riders and other persons on small vehicles can become injured if they should happen to ride through the wire. In certain circumstances, fatalities can occur from the contact between the neck of a rider and the wire used for the tree stake.

Conventional tree stakes are often rather ugly in appearance. The purpose of growing a tree is to beautify an area and to improve the aesthetics of such an area. As such, the installation of staking devices, such as steel rods and rebar, is detrimental to the aesthetic appearance of the area.

Further, in prior staking techniques, the actual staking is a rather complex proceeding. Each of the stakes must be driven into the earth by a hammering device. Next, the wires or cable must be secured to a harness in order to allow the harness to engage with the tree trunk. Finally, the wire cable must be connected to the stake in a proper manner. The forces of the stakes, and their associated cables and harnesses, must be adjusted so that the tree trunk resides in a properly vertical orientation. As such, the prior staking techniques are often time-consuming, cumbersome, and labor-intensive.

In the past, various patents have issued relating to tree staking devices. For example, U.S. Pat. No. 4,848,027, issued on Jul. 18, 1989 to B. Skierwiderski, shows a padded trunk holding ring possessing tree stakes. A trunk holding ring serves to support the young tree which extends through a region. Support spokes are provided having ends which are adjustable relative to the axis of the ring. As such, this device can adapt to the growth of the tree.

U.S. Pat. No. 4,870,781, issued on Oct. 3, 1989 to T. D. Jones, shows a combination tree support and feeder stake that is provided for use in groups to simultaneously support and nourish transplanted trees. Each stake includes a tapered and reinforced body portion formed from plastic with an anchoring unit to be attached to a transplanted tree and a hollow core to receive fertilizer which escapes through holes so as to provide communication between the hollow core and the ground.

U.S. Pat. No. 5,129,179, issued on Jul. 14, 1992 to L. M. Kronmiller, describes a tree trunk holding means that is designed to hold a newly planted tree. An elongated flexible band is wrapped around the first of a pair of stakes and extends to and is wrapped around the tree trunk and then extends to and is wrapped around the second of the pair of stakes. Rings at each of the stakes and at the trunk permit the wound-around condition and a hook-and-loop self-gripping fastener secures the band of the second stake.

U.S. Pat. No. 5,199,214, issued on Apr. 6, 1993 to E. N. Caldwell, teaches a tree staking system. This stake comprises a piece of material having an upper end adapted to be operatively associated with an end of a support rope that is to be interconnected to the tree that is planted in the ground. The piece of material has a lower end adapted to be driven into the ground in spaced relation to the tree by hammering. The stake has a substantially straight hole therein and leads from the upper end at an angle to the centerline. The hole has an upper end that interrupts the upper end adjacent one of the opposed sides thereof so that the hole is adapted to receive a substantially straight shank portion of an anchor pin through the upper end thereof until an attaching end of the pin for the end of the rope abuts the upper end of the stake adjacent the upper end of the hole.

U.S. Pat. No. 5,568,700, issued on Oct. 29, 1996 to Veneziano et al., provides a stand-off device for yieldingly supporting a tree to a tree support stake. The device has an elongated body and an elastomeric cord which extends through the body and which has a tie end extending from the body's distal end so that can be tied to the trunk of a tree. The stand-off device is attached to the tree support stake so that the tree can be held upright at the end of the device when in a windless condition, yet allow the tree to sway in the wind so that the growth and health of the tree will be stimulated.

U.S. Patent Publication No. 2002/0011023, published on Jan. 31, 2002 to D. Ambrose, provides a tree stabilizing assembly designed to support a tree so as to maintain it in a substantially upright position. The assembly includes at least one support member. A tree strap assembly is used to position the support members in spaced relation around the circumference of the tree.

U.S. Patent Publication No. 2008/0092439, published on Apr. 24, 2008 to J. Banks, teaches a tree stake for the staking of a tree having a root ball. This tree stake includes a first anchor member for anchoring the tree stake. A central longitudinal member to supports the tree. A first transverse member connects the first anchor member and the central longitudinal member.

U.S. patent application Ser. No. 12/854,515, filed on Aug. 11, 2010 by the present inventor, also teaches a device for staking a tree. The device has a ring suitable for extending around a trunk of a tree, and a plurality of legs extending downwardly from the ring. The plurality of legs are suitable for the insertion into the earth, and are connected to the ring. A support is connected to the ring and extend upwardly therefrom. A collar is connected to the support and positioned in spaced relation to the ring. The collar also has a diameter suitable for extending around the trunk of the tree. Each of the ring and the support have a split therein so as to allow the trunk of the tree to pass into the interiors of the respective ring and collar.

It is an object of the present invention to a tree stake device that has no protruding elements.

It is another object of the present invention to provide a tree stake device that minimizes the risk of injury.

It is another object of the present invention to provide a tree stake device that effectively stabilizes the tree.

It is another object of the present invention to provide a tree stake device that anchors the root ball of the tree.

It is another object of the present invention to provide a tree stake device that anchors the root ball of It is another object of the present invention to provide a tree stake device that is adaptable to various soil conditions and tree sizes.

It is another object of the present invention to provide a tree stake device that has an improved aesthetic appearance.

It is another object of the present invention to provide a tree stake device that has a reduced freight cost.

It is yet another object of the present invention to provide a tree stake device that is constructed of a biodegradable material.

It is a further object of the present invention to provide a tree stake device that is quick and easy to install.

It is a further object of the present invention to provide a tree stake device that is easy to mow around.

It is still a further object of the present invention to provide a tree stake device that is easy to manufacture, relatively inexpensive and reusable.

These and other objects and advantages of the present invention will become apparent from a reading of the attached specification and appended claims.

BRIEF SUMMARY OF THE INVENTION

The present invention is a device for staking a tree into the earth that comprises a ring suitable for extending around the trunk of the tree, and a plurality of brackets connected to and circumferentially spaced about the ring. The plurality of brackets extend radially outwardly of the ring. Each of the brackets defines an aperture of a size suitable for receiving a stake therethrough so as to secure the ring in a position relative to the earth. The device also includes a support connected to the ring and extending upwardly therefrom, and a collar connected to the support and positioned in spaced relation to the ring. The collar has a diameter suitable for extending around the trunk of the tree. The collar has a diameter less than a diameter of the ring. The collar extends in a plane substantially parallel to the plane in which the ring extends.

In the present invention, each of the brackets is U-shaped. The ring is split so as to define an opening with a size suitable allowing the trunk of the tree to be passed therethrough and into an interior of the ring. The plurality of brackets includes three brackets each being circumferentially spaced from an adjacent bracket. The support is a rod affixed to the ring at one end and to the collar at another end. The rod extends at an angle upwardly and inwardly from the ring. The support includes three rods equally circumferentially spaced from each other at the ring and equally circumferentially spaced from each other at the collar. In an alternative embodiment, the three rods extend upwardly and outwardly from the support and are not affixed to a collar.

In the present invention, the collar has a split therein so as to define a split opening to an interior of the collar so as to allow the trunk of the tree to be passed into the interior. The collar includes a first collar piece affixed to the support, the collar piece having cutouts formed at each end thereof. The collar also includes a second collar piece having cutouts formed on each end thereof. The cutouts of the second collar piece matingly engage the cutouts of the first collar piece so as to close the split.

In the present invention, a plurality of stakes extend downwardly through the apertures of the brackets. The plurality of stakes are suitable for insertion into the earth. Each of the plurality of stakes has a flat head with a size suitable for preventing the stake from fully passing through the aperture. A shaft is connected to the flat head and has a pointed tip. A cleat can be positioned between the flat head and the pointed tip. The cleat has a first end affixed to the shaft and a second end facing inwardly of the stake. An annular surface having an elastomeric material is affixed to an inner surface of the collar. The device of parts thereof may be constructed of a biodegradable material, such as biodegradable plastic.

DETAILED DESCRIPTION OF THE INVENTION

Figure 1:
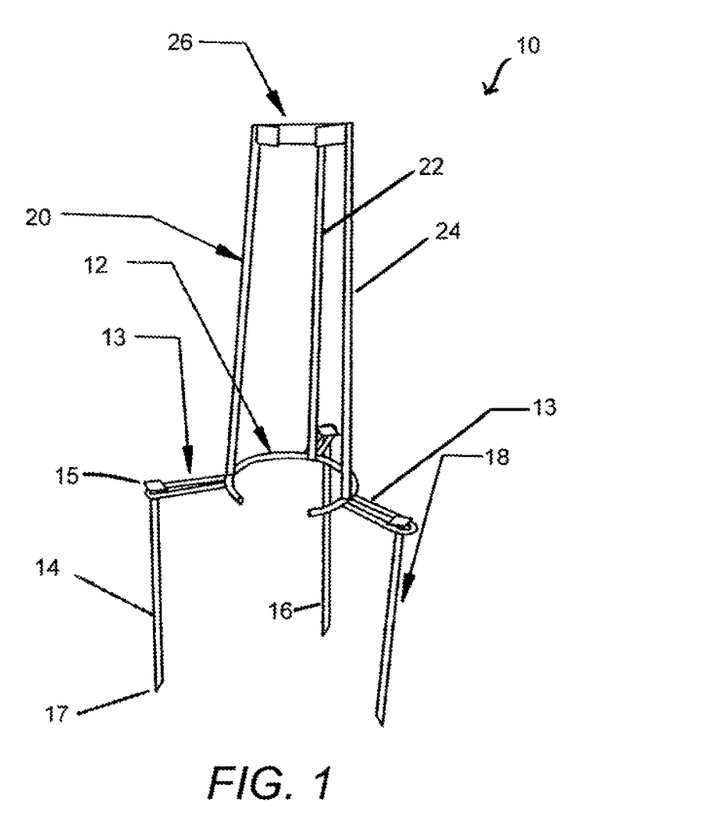
FIG. 1 is perspective view of the tree staking device of the present invention.

Referring to FIG. 1, there is shown the tree staking device 10 in association with the preferred embodiment of the present invention. The tree staking device 10 includes a ring 12 having a diameter suitable for extending around the trunk of a tree. A plurality of supports 20, 22 and 24 are connected to the ring and extend upwardly therefrom. A collar 26 is connected to the supports 20, 22 and 24 and positioned in spaced relationship to the ring 12. The collar 26 also has a diameter suitable for extending around the trunk of the tree.

As can be seen in FIG. 1, the collar 26 has a diameter that is less than a diameter of the ring 12. The collar 26 extends in a plane that is substantially parallel to a plane in which the ring 12 extends.

In FIG. 1, brackets 13 are connected to and spaced about the ring 12. The brackets 13 extend radially outwardly from the ring 12. In a preferred embodiment of the present invention, the brackets 13 are of a U-shape, defining an aperture therethrough. Stakes 14, 16 and 18 are shown as extending through the respective apertures 13. Each of the stakes has a flat head 15, being generally square, that prevents the stake from fully passing through the aperture of the bracket 13. The stakes 14, 16 and 18 each have a shaft connected to the flat head and a pointed end 17 opposite the flat head 15.

As will be described hereinafter, the ring 12 has a diameter that is less than a diameter of the root ball so that the ring 12 can be positioned directly upon the top of the root ball. As such, the present invention is effectively able to avoid any damage to the root ball since the stakes 14, 16 and 18 are inserted into the earth in an area beyond the root ball.

In a preferred embodiment of the present invention, there are three brackets 13. Each of the U-shaped brackets 13 are equally circumferentially spaced from each other. Each of the U-shaped brackets 13 can be welded to, or otherwise formed with, the ring 12.

Each of the supports 20, 22 and 24 is a rod which is affixed to the ring 12 at one end thereof and to the collar 26 at an opposite end thereof. The supports 20, 22 and 24 are actually three rods that are equally circumferentially spaced from each other at the ring 12 and equally circumferentially spaced from each other at the collar 26. Each of the supports 20, 22 and 24 extends at an angle upwardly and inwardly from the ring 12. The collar 26 will be arranged so as to be in a plane that is in spaced parallel relationship to a plane in which the ring 12 resides. The collar 26 will be generally concentric with the ring 12.

Figure 2:
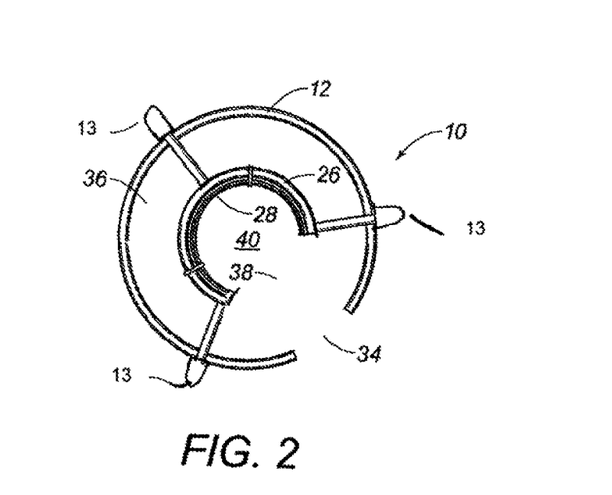
FIG. 2 is a plan view of the preferred embodiment of the tree staking device of the present invention.

FIG. 2 is a plan view of the tree staking device 10 of the present invention. The ring 12 has a split 34 formed therein. The split 34 is suitable for allowing the trunk of the tree to be inserted into the interior 36 of the ring 12. The collar 26 also has a split 38 formed therein. The split 38 defines a slot through which the trunk of the tree can be inserted so that the trunk of the tree can reside in the interior 40 of the collar 26. The U-shaped brackets 13 extend radially outwardly from the collar 26 and are connected to the ring 12.

It should be noted that the collar 26 can be somewhat pliable. For example, it is possible that the collar 26 can be suitably squeezed so that the ends adjacent to the opening 38 can be moved toward one another so as to enclose the trunk of the tree. Additionally, the pliability of the collar 26 can also allow the opening 28 to be suitably widened so as to allow larger diameters of tree trunk to be placed therein.

Figure 3:
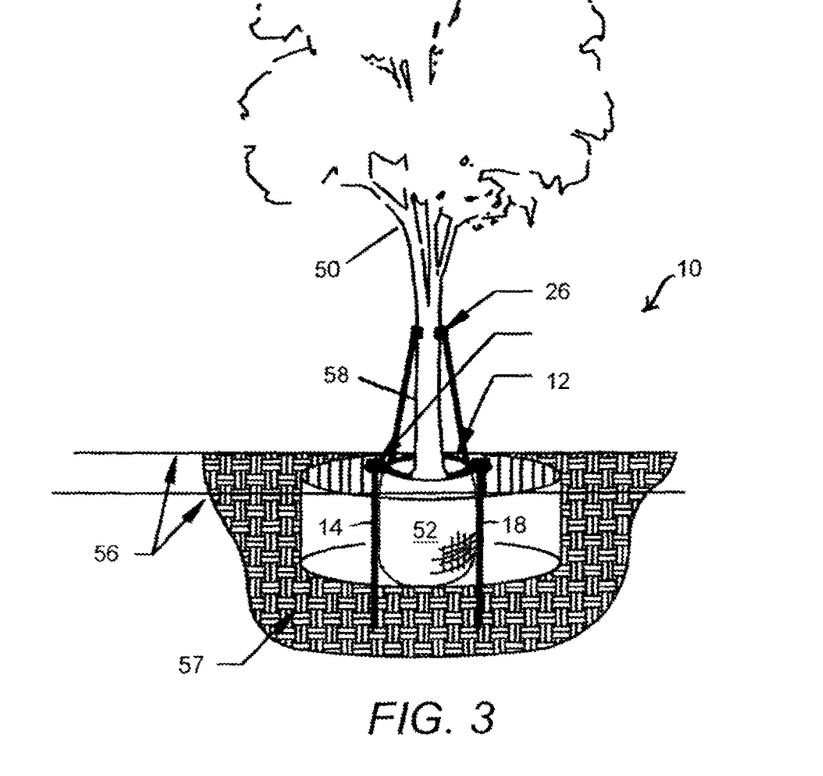
FIG. 3 is a side elevational view of the tree staking device of the present invention as applied to a tree.

FIG. 3 shows the application of the tree staking device 10 in association with a tree 50. The tree 50 has a root ball 52 received within an excavation 54 in the earth 56. The ring 12 has a diameter that is less than a diameter of root ball 52. Stakes 14 and 18 are illustrated as positioned in the earth 56 in a location beyond the outer periphery of the root ball 52. Importantly, the stakes 14 and 18 are shown extending into undisturbed earth 57. The ring 12 will be positioned above the earth 56. The trunk 58 of the tree 50 extends upwardly through the interior of the ring 12 and through the interior of the collar 26. As such, it can be seen that the collar 26 allows the tree 50 to effectively sway in the wind. This serves to stimulate the tree. There are no wires or cables that are connected to the tree staking device 10. As such, there are no protruding elements that can cause potential risk to persons passing thereby. There are no wires that can potentially injure or kill those riding on bicycles, or motorized vehicles, in the vicinity of the tree staking device 10. The tree staking device 10 stabilizes the tree 50 by anchoring the root ball 52. It does not bind the tree so as to avoid any negative effects of artificial stabilization. The device 10 allow the tree to sway and promote proper root development. The device 10 has a custom designed appearance so as to enhance the aesthetic appeal of the device 10 and to make the property therearound appear finished. The present invention greatly enhances curb appeal. The device 10 can be installed in less than one minute. Other than a hammer or mallet, no tools are required. The device 10 will not interfere with mowing. The device 10 has a relative low initial cost. It is reusable. Because of the easy installation, the present invention is not labor intensive.

The present invention has several advantages over the Applicant's previous invention, application Ser. No. 12/854,515. Notably, in the previous application, if the canopy of the tree was low, the top collar could capture the branches making it difficult for placement and centering of the tree staking device. It was also difficult to center the trunk to the root ball anchor ring not having the top collar. The configuration of the present invention with the stakes makes it easier to center the tree stake device. Additionally, freight costs for the device of the previous application was quite high. With the new stake configuration, freight costs are quite low, saving as much as half the cost of freight.

Figure 4A:
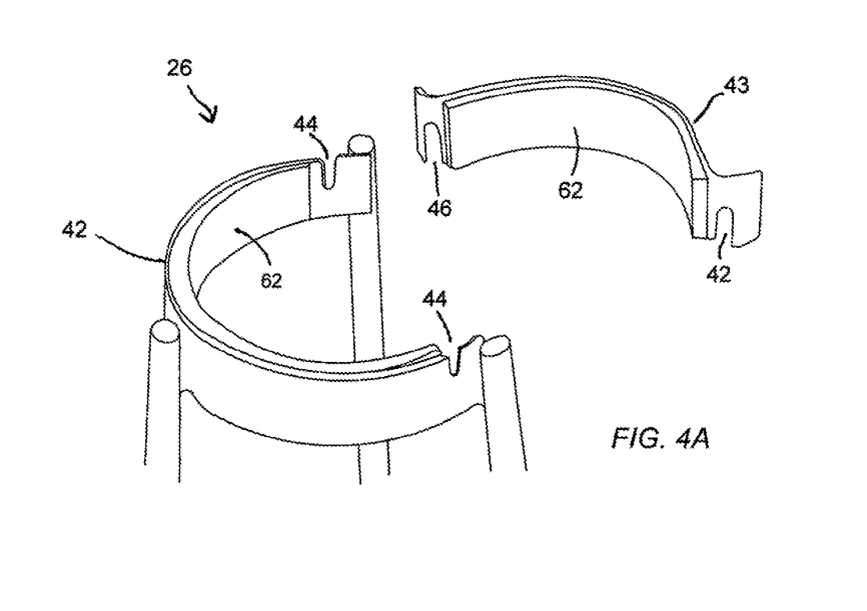
FIG. 4A is a perspective view of the collar of the tree staking device of the present invention, wherein the collar is in an open configuration.

FIG. 4A shows a perspective view of the collar 26 of the present invention wherein the components of the collar 26 are shown. As can be seen, the collar 26 has an annular shape and includes first collar piece 42 and second collar piece 43. The first collar piece 42 is secured to the tree staking device.

Figure 4B:
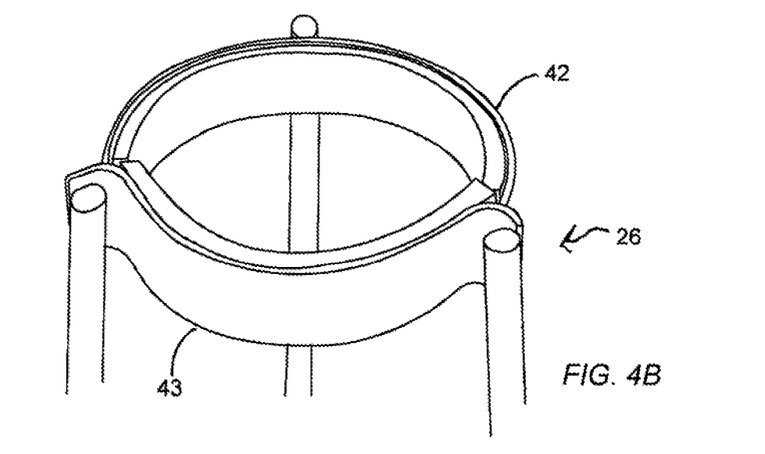
FIG. 4B is a perspective view of the collar of the tree staking device of the present invention, wherein the collar is in an closed configuration.

The second collar piece 43 is received by the first collar piece 42. Specifically, the first collar piece has cutouts 44 which matingly correspond to the cutouts 46 on the second collar piece 43. This configuration makes the collar 26 easy to install.

A two-piece elastomeric strip 62 is affixed to an inner wall of the collar 26 so as to extend inwardly therefrom. This annular section of elastomeric material is positioned in proximity to the trunk of the tree. It serves to cushion any potentially damaging contact between the trunk of the tree and the collar 26.

Figure 5:
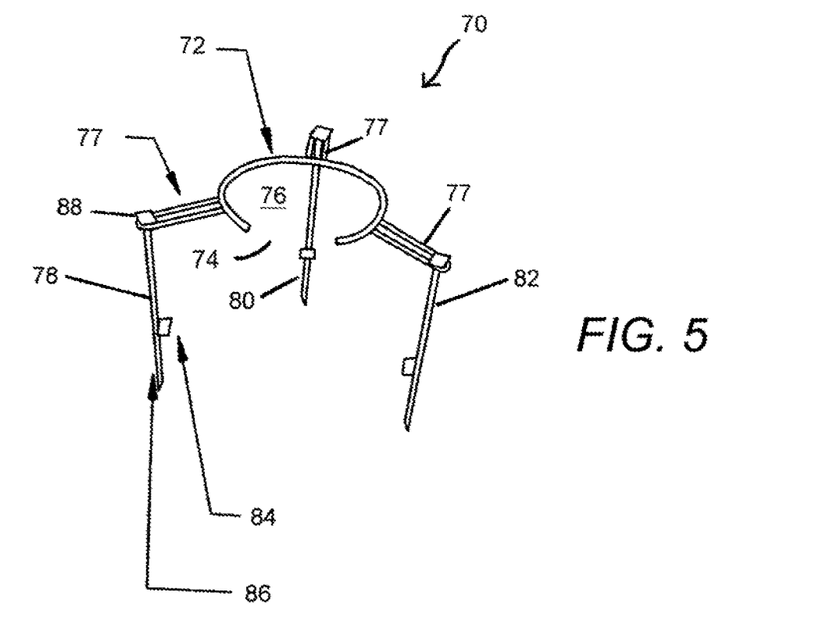
FIG. 5 is a perspective view of an alternative embodiment of the tree staking device of the present invention designed, in particular, for below-grade application.

FIG. 5 shows a plan view of an alternative embodiment 70 of the tree staking device of the present invention. This alternative embodiment of the tree staking device 70 is designed for application in below-grade applications. The tree staking device 70 includes a ring 72 having a split 74 therein. Split 74 defines an opening into the interior 76 of the ring 72. The split 74 should have a suitable size so as to allow the trunk of the tree to be inserted therethrough. U-shaped brackets 77 are affixed to the ring 72 so as to extend radially outwardly therefrom. Each of the brackets 77 has a respective stakes 78, 80 and 82 positioned therethrough.

Figure 6:
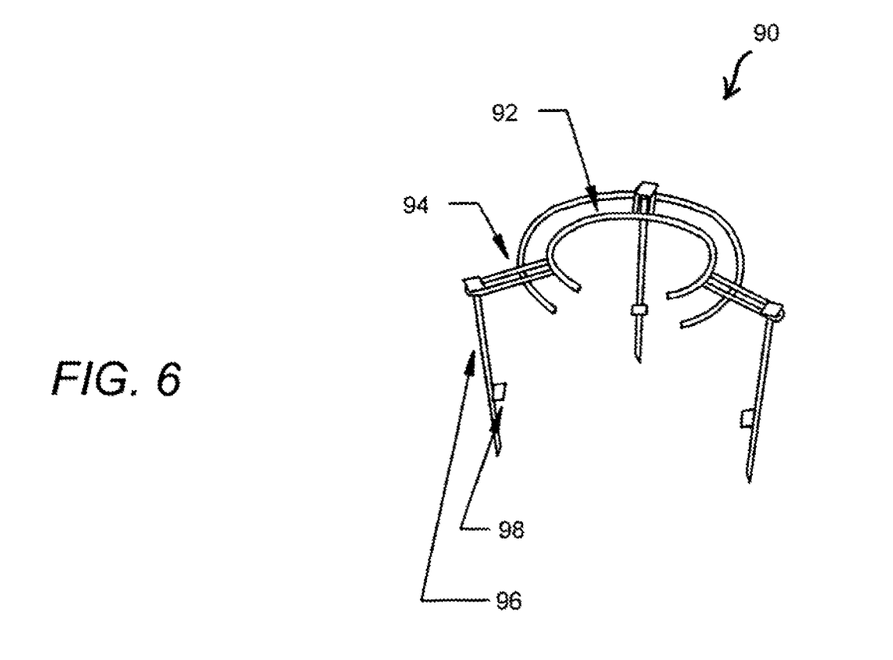
FIG. 6 is a perspective view of the alternative embodiment of FIG. 5 having a double ring.

FIG. 6 is a perspective view of variation on the alternative embodiment of the tree staking device 70. FIG. 6 shows the tree staking device 90. Importantly, in FIG. 6 the tree staking device 90 is shown to have a first ring 92 and a second ring 94. The second ring 94 has a diameter greater than the diameter of the first ring 92. This alternative embodiment 90 is also useful in below grade applications. Additionally, the alternative embodiment 90 shows the stake 78 to have a shaft 96 and a cleat 98. The cleat 98 (also shown in as reference numeral 84 in FIG. 5) is present on each of the stakes may also be used in the preferred embodiment 10 of the present invention (although not shown in FIG. 1). The cleat 98 has one end connected to the shaft 96 and an opposite end facing inwardly of the stake 78. The cleat 98 prevents movement of the stake once it is driven into the earth.

Figure 7:
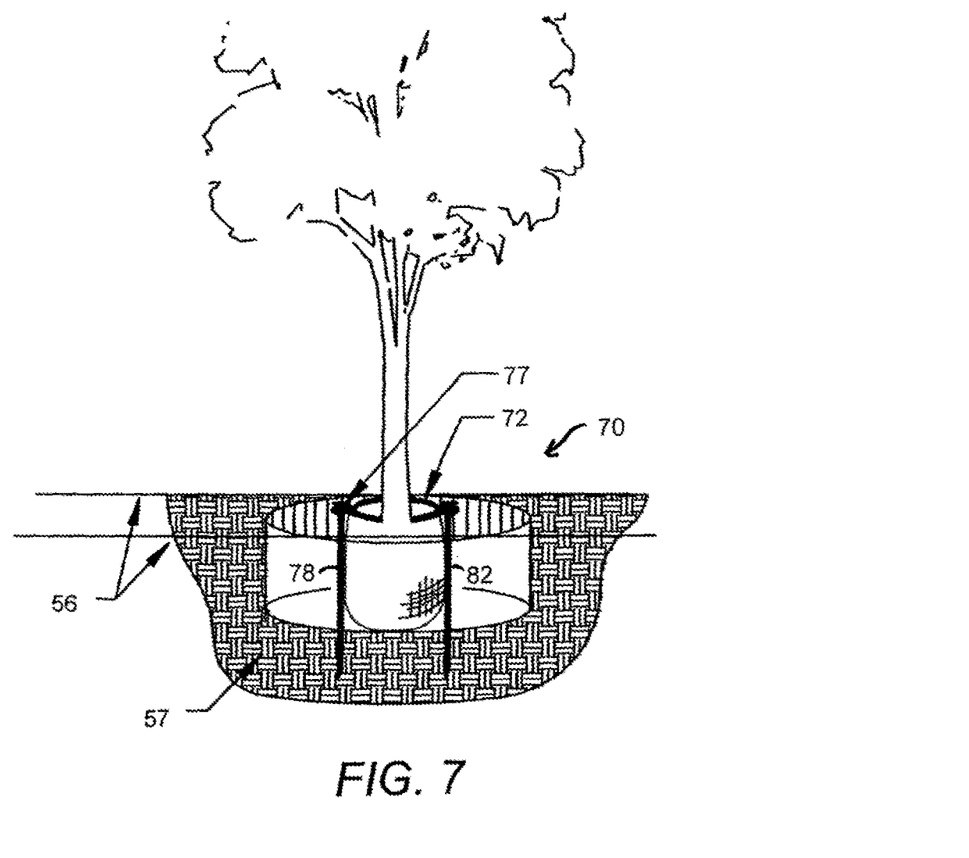
FIG. 7 is a side elevational view showing the alternative embodiment of the tree staking device of the present invention as applied in a below-grade application.

In FIG. 7, it can be seen that the tree staking device 70 is applied in a below grade application. Ring 72 and bracket 77 are shown in FIG. 7. Importantly, in FIG. 7 it can be seen how the stakes 78 and 82 extend below the excavation level of the earth 56 into undisturbed ground 57.

A grate (not shown) may be affixed to the surface of the earth 56. The grate can have an opening therein so as to allow the trunk of the tree to extend therethrough. The tree staking device 70 has its ring 72 positioned on the top surface of the root ball. The legs 80 and 82 extend into the earth 56 beyond the outer periphery of the root ball. Through the use of this below-grade device, the appearance of the tree is greatly improved.

Figure 8:
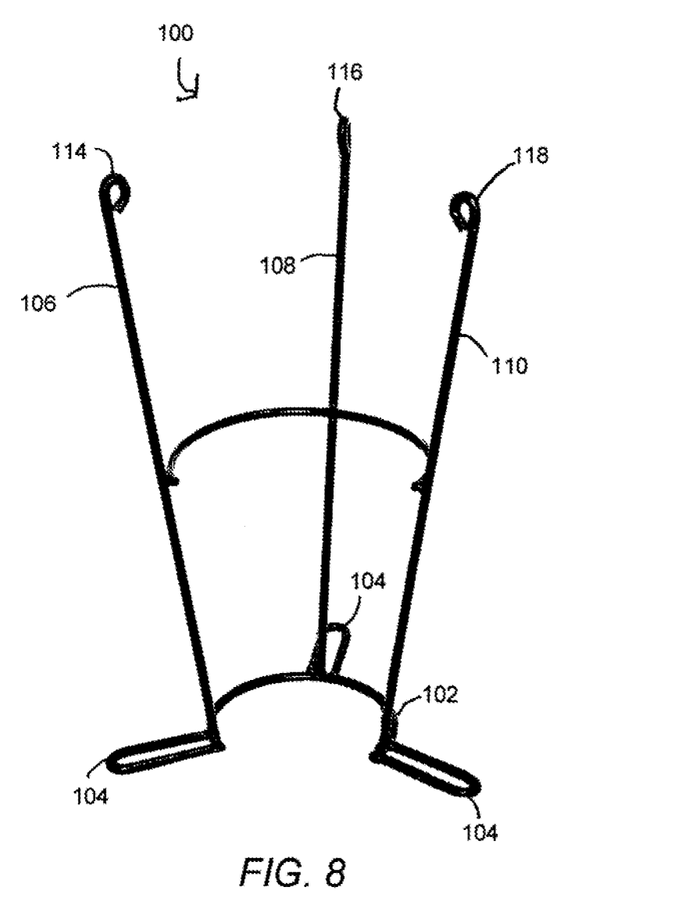
FIG. 8 is a perspective view of another alternative embodiment of the present invention.

FIG. 8 shows a perspective view of an alternative embodiment of the tree staking device 100 of the present invention. The tree staking device 100 is used for trees with trunks that split closer to the ground. Similar to the other embodiments, the tree staking device 100 has a ring 102 with brackets 104 connected thereto. Support rods 106, 108 and 110 extend upwardly and outwardly from the ring 102 so as to accommodate the multi-trunk trees. Eyelets 114, 116 and 118 are positioned at the top of respective support rods 106, 108 and 110. The eyelets 114, 116 and 118 can be used to attach to the multiple trunks or to define a boundary about the trunks.

The tree stake device of the present invention, or portions thereof, may be constructed of a biodegradable material. The material may be a biodegradable plastic material. The material would ideally not degrade until the use of the tree stake device is no longer necessary. Thus, below grade parts of the tree stake device would not interfere with the roots of the mature tree.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A device for staking a tree into the earth, the device comprising:

a ring having a diameter, said ring being formed of a pliable rod, said ring suitable for extending around a trunk of the tree; and a plurality of brackets directly connected to and circumferentially spaced around said ring, said plurality of brackets extending radially a substantial distance outwardly of said ring, said substantial distance being at lest one half of said diameter of said ring, each of said plurality of brackets defining an aperture of a size suitable for receiving a stake therethrough so as to secure said ring in a position adjacent the root ball and residing adjacent a surface of the earth, each of said plurality of brackets having a generally U-shaped configuration, said plurality of brackets being coplanar with said ring.

2. The device of claim 1, said ring being split so as to define an opening, said opening having a size suitable so as to allow the trunk of the tree to be passed therethrough and into an interior of said ring.

3. The device of claim 1, said plurality of brackets comprising three brackets each being equally circumferentially spaced from an adjacent bracket.

4. The device of claim 1, further comprising:

a plurality of stakes extending downwardly through respective apertures of said plurality of brackets, said plurality of stakes suitable for insertion into the earth.

5. The device of claim 4, each of said plurality of stakes comprising:

a flat head having a size suitable for preventing said stake from fully passing through said aperture; and a shaft having a pointed tip, said shaft affixed to a bottom surface of said flat head, said pointed tip being opposite said flat head.

6. The device of claim 5, each of said plurality of stakes further comprising:

a cleat positioned between said flat head and said pointed tip, said cleat having a first end affixed to said shaft and a second end facing inwardly of said stake.

7. An assembly for positioning a tree relative to the earth, the assembly comprising:

a root ball having a diameter, said root ball having a trunk of the tree extending upwardly therefrom;

a ring having a diameter less than said diameter of said root ball, said ring being formed of a pliable rod, said ring positioned onto a top of said root ball, said ring extending around said trunk of the tree;

a plurality of brackets connected to and circumferentially spaced about said ring, said plurality of brackets extending radially a substantial distance outwardly of said ring, said substantial distance being at least one half of said diameter of said ring, each of said plurality of brackets defining an aperture of a size suitable for receiving a stake therethrough so as to secure said ring in a position against the earth, said plurality of brackets being generally coplanar with said ring; and a plurality of stakes extending downwardly through said apertures of said plurality of brackets, said plurality of stakes suitable for insertion into the earth.

8. The device of claim 7, each of said plurality of stakes comprising:

a flat head having a size suitable for preventing said stake from fully passing through said aperture;

a shaft having a pointed tip, said shaft affixed to a bottom surface of said flat head, said pointed tip being opposite said flat head; and a cleat positioned between said flat head and said pointed tip, said cleat having a first end affixed to said shaft and a second end facing inwardly of said stake.

9. The device of claim 7, the device being formed of a biodegradable plastic material.

\* \* \* \* \*